US009564107B2

(12) United States Patent
Hsieh

(10) Patent No.: US 9,564,107 B2
(45) Date of Patent: Feb. 7, 2017

(54) ELECTRONIC DEVICE AND METHOD FOR ADJUSTING CHARACTER OF PAGE

(71) Applicant: FIH (HONG KONG) LIMITED, Kowloon (HK)

(72) Inventor: Hsing-Chun Hsieh, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/688,742

(22) Filed: Apr. 16, 2015

(65) Prior Publication Data

US 2016/0155424 A1 Jun. 2, 2016

(30) Foreign Application Priority Data

Dec. 1, 2014 (TW) ............................ 103141686 A

(51) Int. Cl.
*G06T 11/20* (2006.01)
*G09G 5/26* (2006.01)

(52) U.S. Cl.
CPC ............ *G09G 5/26* (2013.01); *G09G 2320/08* (2013.01); *G09G 2340/045* (2013.01); *G09G 2380/14* (2013.01)

(58) Field of Classification Search
CPC ........................................................ G09G 5/26
USPC ......................................................... 345/472
See application file for complete search history.

(56) References Cited

U.S. PATENT DOCUMENTS

| | | | | |
|---|---|---|---|---|
| 6,927,773 B2 * | 8/2005 | Momozono | G09G 5/26 | 345/467 |
| 7,797,631 B2 * | 9/2010 | Yoshida | G06K 15/02 | 345/467 |
| 8,928,669 B2 * | 1/2015 | Kobayashi | G09G 5/003 | 345/204 |
| 2007/0104366 A1 * | 5/2007 | Sprague | G06T 11/60 | 382/176 |
| 2008/0082913 A1 * | 4/2008 | Lloyd | G09G 5/26 | 715/246 |
| 2015/0255044 A1 * | 9/2015 | Hirasawa | H04N 5/44504 | 348/569 |
| 2015/0347356 A1 * | 12/2015 | Beaver | G06F 3/03 | 345/472 |

FOREIGN PATENT DOCUMENTS

| | | |
|---|---|---|
| CN | 101419661 B | 8/2011 |
| CN | 103280208 A | 9/2013 |

* cited by examiner

*Primary Examiner* — Javid A Amini
(74) *Attorney, Agent, or Firm* — Zhigang Ma

(57) ABSTRACT

A method for adjusting characters of a page includes determines a selected page on a display device of an electronic device. Sizes of characters on the selected page are acquired. An adjustment ratio of the characters on the selected page is computed according to a predetermined calculation method. A size of each of the characters on the selected page is adjusted according to the acquired sizes of the characters on the selected page and the computed adjustment ratio of the characters on the selected page. Each of the characters on the selected page on the displaying device is displayed with the adjusted size of each of the characters on the selected page.

3 Claims, 3 Drawing Sheets

ELECTRONIC DEVICE AND METHOD FOR ADJUSTING CHARACTER OF PAGE

CROSS-REFERENCE TO RELATED APPLICATIONS

This application claims priority to Taiwan Patent Application No. 103141686 filed on Dec. 1, 2014, the contents of which are incorporated by reference herein.

FIELD

Embodiments of the present disclosure relate to character processing technology, and particularly to adjust characters of a page using an electronic device.

BACKGROUND

When a user is looking through a page, if sizes of characters on the page are too small or too big for the user, the user has to adjust the sizes of characters manually until the user is satisfied with the adjusted sizes of characters.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
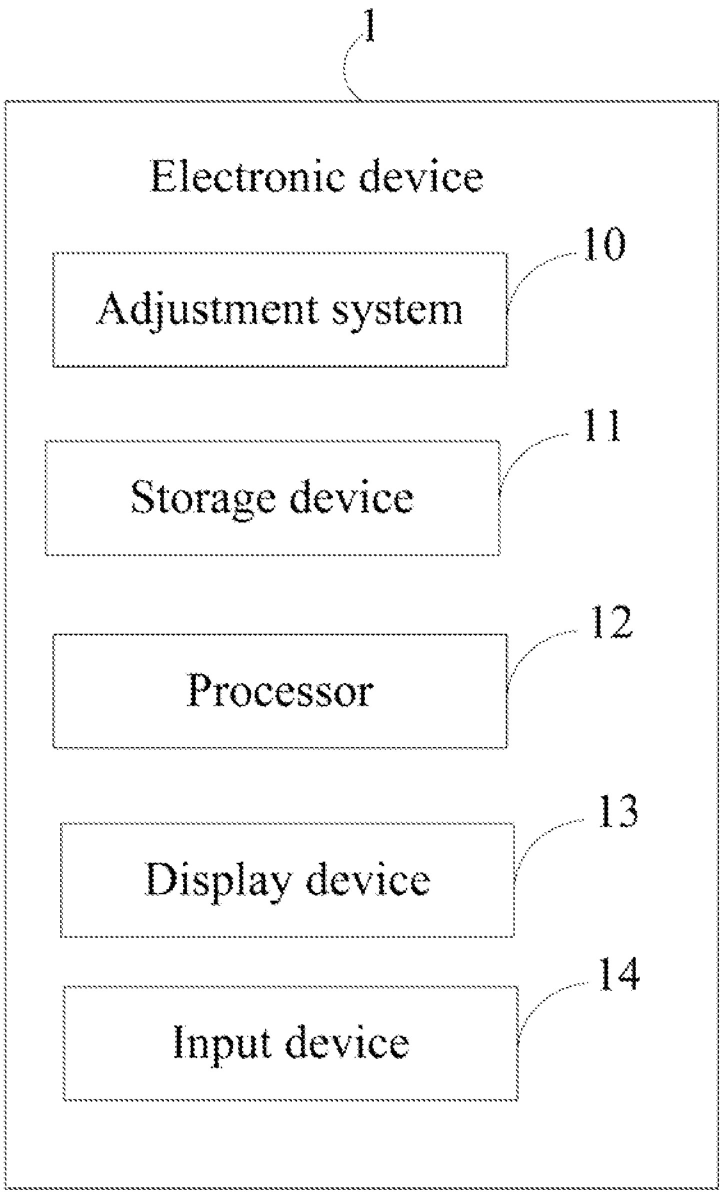
FIG. 1 is a block diagram of one embodiment of an electronic device including an adjustment system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of an electronic device. In at least one embodiment as shown in FIG. 1, an electronic device 1 includes, but is not limited to, an adjustment system 10, a storage device 11, at least one processor 12, a display device 13, and an input device 14. The electronic device 1 can be a tablet computer, a notebook computer, a smart phone, a personal digital assistant (PDA), or another suitable electronic device. FIG. 1 illustrates only one example of the electronic device that can include more or fewer components than illustrated, or have a different configuration of the various components in other embodiments.

When a user is looking through a page, the adjustment system 10 can automatically adjust the sizes of the characters on the page according to predetermined options or settings.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a microprocessor, or other data processor chip that performs functions of the adjustment system 10 in the electronic device 1. The display device 13 can display images and videos, and the input device 14 can be a mouse, a keyboard, or a touch panel.

Figure 2:
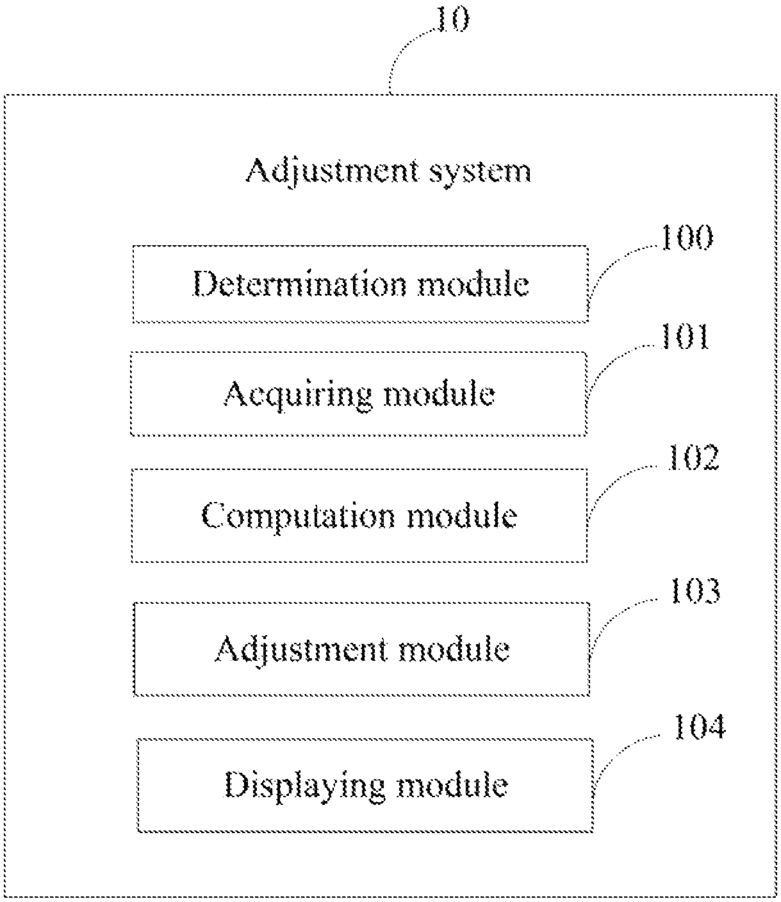
FIG. 2 is a block diagram of one embodiment of function modules of the adjustment system in the electronic device of FIG. 1.

FIG. 2 is a block diagram of one embodiment of function modules of the adjustment system. In at least one embodiment, the adjustment system 10 can include a determination module 100, an acquiring module 101, a computation module 102, an adjustment module 103 and a displaying module 104. The function modules 100, 101, 102, 103 and 104 can include computerized codes in the form of one or more programs, which are stored in the storage device 11. The at least one processor 12 executes the computerized codes to provide functions of the function modules 100-104.

When the user selects a page on the display device 13, the determination module 100 determines the selected page. For example, the selected page can be a web page, a page provided by an application, a page of user interface (UI) of the electronic device 1.

The acquiring module 101 acquires sizes of characters on the selected page.

The computation module 102 computes an adjustment ratio of the characters on the selected page according to a predetermined calculation method. In at least one embodiment, the adjustment system 10 provides options on a user interface for the user to define or select the predetermined calculation method, the computation module 102 determines the predetermined calculation method selected or defined by the user. In at least one embodiment, the options of calculation method include a first calculation method, a second calculation method and a third calculation method.

In at least one embodiment, the first calculation method is determined to be the predetermined calculation method. According to the acquired sizes of the characters on the selected page, the computation module 102 computes an average size of the characters on the selected page. The computation module 102 computes the adjustment ratio of the characters on the selected page by dividing a first preset size by the average size of the characters on the selected page. The average size of the characters on the selected page is calculated by dividing a sum of the acquired sizes of all the characters on the selected page by a number of the characters on the selected page. For example, a selected page includes five characters. Sizes of the characters on the selected page are represented by F1, F2, F3, F4 and F5. An average size of the characters on the selected page is (F1+F2+F3+F4+F5)/5.

In other embodiments, the second calculation method is determined to be the predetermined calculation method. The computation module 102 acquires sizes of characters in a first preset region of the selected page. According to the sizes of the characters in the first preset region, the computation module 102 computes an average size of the characters in the first preset region. The computation module 102 computes the adjustment ratio of the characters on the selected page by dividing a second preset size by the average size of the characters in the first preset region.

In other embodiments, the third calculation method is determined to be the predetermined calculation method. The computation module 102 acquires sizes of characters in a second preset region of the selected page. The computation module 102 acquires sizes of characters in a third preset region of the selected page. According to the sizes of the characters in the second preset region and the sizes of the characters in the third preset region, the computation module 102 computes a weighted average size according to a formula provided below. The computation module 102 computes the adjustment ratio of the characters on the selected page by dividing a third preset size by the weighted average size.

In at least one embodiment, the computation module 102 computes the weighted average size according to a formula of $$Fwavg=(\sum_{i=1}^{n}(f(i)/n\times w1)+\sum_{i=1}^{m}(g(i)/m\times w2))/(w1+w2).$$

In the formula, f(i) represents a size of a ith character in the second preset region, w1 represents a weight corresponding to the characters in the second preset region, n represents a number of the characters in the second preset region, g(i) represents a size of a ith character in the third preset region, w2 represents a weight corresponding to the characters in the third preset region, and m represents a number of the characters in the third preset region.

In at least one embodiment, the first preset size, the second preset size and the third preset size are preset data and can be set by the user on the user interface. The first preset size, the second preset size and the third preset size can be same or different.

The adjustment module 103 adjusts a size of each of the characters on the selected page according to the acquired sizes of the characters on the selected page and the computed adjustment ratio of the characters on the selected page.

The displaying module 104 displays each of the characters on the selected page on the display device 13 with the adjusted size of each of the characters on the selected page. In at least one embodiment, the adjusted size of each of the characters on the selected page is calculated by multiplying the acquired size of each of the characters on the selected page by the computed adjustment ratio of the characters on the selected page.

Figure 3:
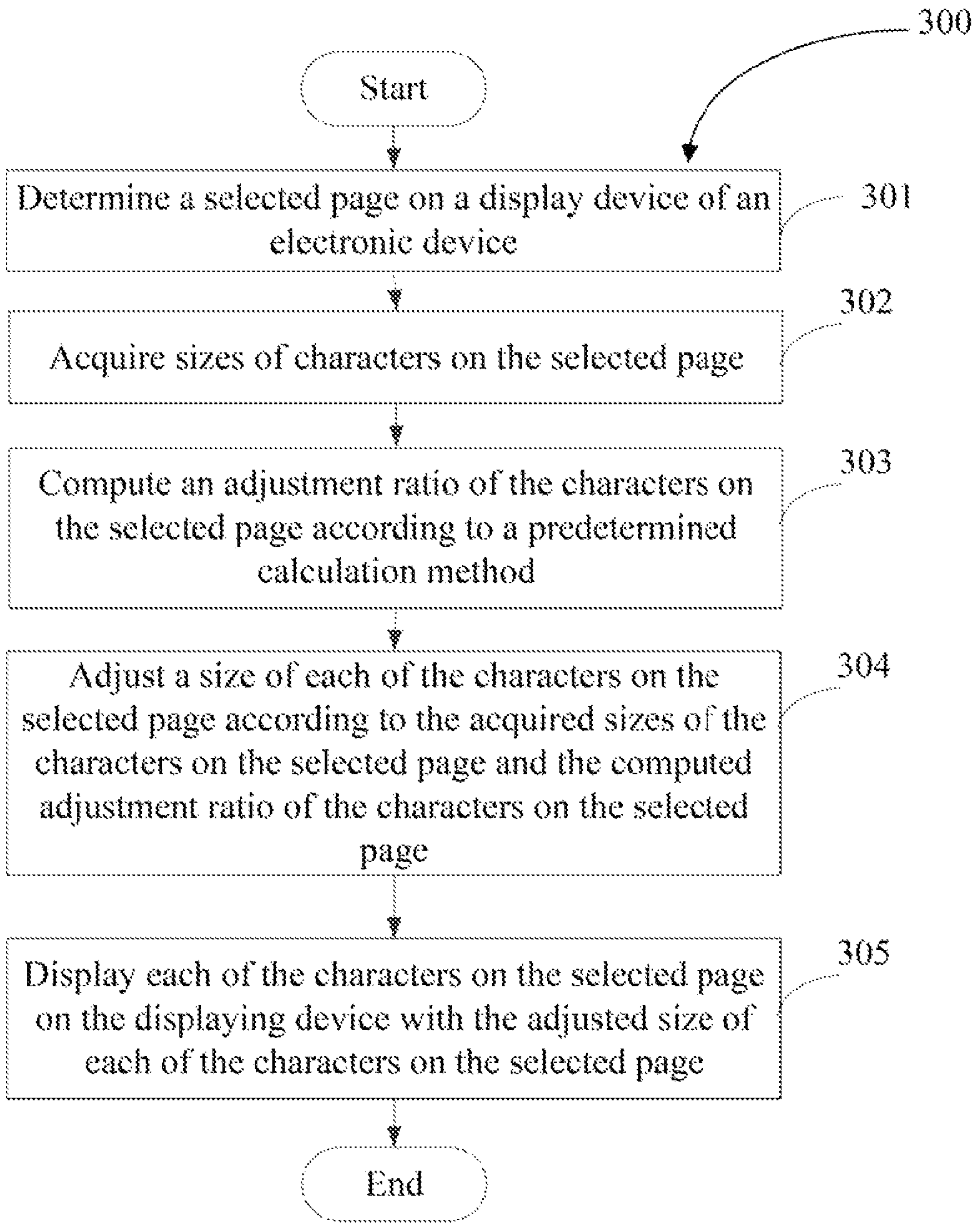
FIG. 3 illustrates a flowchart of one embodiment of a method for adjusting characters of a page using the electronic device of FIG. 1.

FIG. 3 illustrates a flowchart is presented in accordance with an example embodiment. An example method 300 is provided by way of example, as there are a variety of ways to carry out the method. The example method 300 described below can be carried out using the configurations illustrated in FIGS. 1 and 2 for example, and various elements of these figures are referenced in explaining example method 300. Each block shown in FIG. 3 represents one or more processes, methods, or subroutines carried out in the example method 300. Additionally, the illustrated order of blocks is by example only and the order of the blocks can be changed. The example method 300 can begin at block 301. Depending on the embodiment, additional steps can be added, others removed, and the ordering of the steps can be changed.

At block 301, when the user selects a page on a display device of an electronic device, a determination module determines the selected page. For example, the selected page can be a web page, a page provided by an application, a page of user interface (UI) of the electronic device 1.

At block 302, an acquiring module acquires sizes of characters on the selected page.

At block 303, a computation module computes an adjustment ratio of the characters on the selected page according to a predetermined calculation method. In at least one embodiment, a adjustment system provides options on a user interface for the user to define or select the predetermined calculation method, the computation module determines the predetermined calculation method selected or defined by the user. In at least one embodiment, the options of calculation method include a first calculation method, a second calculation method and a third calculation method.

In at least one embodiment, the first calculation method is determined to be the predetermined calculation method. According to the acquired sizes of the characters on the selected page, the computation module computes an average size of the characters on the selected page. The computation module computes the adjustment ratio of the characters on the selected page by dividing a first preset size by the average size of the characters on the selected page. The average size of the characters on the selected page is calculated by dividing a sum of the acquired sizes of all the characters on the selected page by a number of the characters on the selected page.

In other embodiments, the second calculation method is determined to be the predetermined calculation method. The computation module acquires sizes of characters in a first preset region of the selected page. According to the sizes of the characters in the first preset region, the computation module computes an average size of the characters in the first preset region. The computation module computes the adjustment ratio of the characters on the selected page by dividing a second preset size by the average size of the characters in the first preset region.

In other embodiments, the third calculation method is determined to be the predetermined calculation method. The computation module acquires sizes of characters in a second preset region of the selected page. The computation module acquires sizes of characters in a third preset region of the selected page. According to the sizes of the characters in the second preset region and the sizes of the characters in the third preset region, the computation module computes a weighted average size. The computation module computes the adjustment ratio of the characters on the selected page by dividing a third preset size by the weighted average size according to a formula provided below.

In at least one embodiment, the computation module computes the weighted average size according to a formula of $$Fwavg=(\Sigma_{i=1}^{n}(f(i)/n\times w1)+\Sigma_{i=1}^{m}(g(i)/m\times w2))/(w1+w2).$$

In the formula, f(i) represents a size of a ith character in the second preset region, w1 represents a weight corresponding to the characters in the second preset region, n represents a number of the characters in the second preset region, g(i) represents a size of a ith character in the third preset region, w2 represents a weight corresponding to the characters in the third preset region, and m represents a number of the characters in the third preset region.

In at least one embodiment, the first preset size, the second preset size and the third preset size are preset data and can be set by the user on the user interface. The first preset size, the second preset size and the third preset size can be same or different.

At block 304, an adjustment module adjusts a size of each of the characters on the selected page according to the acquired sizes of the characters on the selected page and the computed adjustment ratio of the characters on the selected page.

At block 305, a displaying module displays each of the characters on the selected page on the displaying device with the adjusted size of each of the characters on the selected page. In at least one embodiment, the adjusted size of each of the characters on the selected page equals that multiplying the acquired size of each of the characters on the selected page by the computed adjustment ratio of the characters on the selected page.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for adjusting characters of a page using an electronic device being executed by a processor of the electronic device, the method comprising:

determining a selected page on a display device of the electronic device;

acquiring sizes of characters on the selected page;

computing an adjustment ratio of the characters on the selected page according to a predetermined calculation method;

adjusting a size of each of the characters on the selected page according to the acquired sizes of the characters on the selected page and the computed adjustment ratio of the characters on the selected page; and displaying each of the characters on the selected page on the displaying device with the adjusted size of each of the characters on the selected page;

wherein the adjustment ratio of the characters on the selected page is computed according to the predetermined calculation method by:

acquiring sizes of characters in a first preset region of the selected page;

acquiring sizes of characters in a second preset region of the selected page;

computing a weighted average size according to the sizes of the characters in the first preset region and the sizes of the characters in the second preset region; and computing the adjustment ratio of the characters on the selected page by dividing a preset size by the weighted average size;

wherein the weighted average size is computed according to a formula of $$Fwavg=\Sigma_{i=1}^{n}(f(i)/n\times w1)+\Sigma_{i=1}^{m}(g(i)/m\times w2))/(w1+w2),$$

f(i) representing a size of a ith character in the first preset region, w1 representing a weight corresponding to the characters in the first preset region, n representing a number of the characters in the first preset region, g(i) representing a size of a ith character in the second preset region, w2 representing a weight corresponding to the characters in the second preset region, m representing a number of the characters in the second preset region.

2. An electronic device, comprising:

a processor; and a storage device that stores one or more programs, when executed by the at least one processor, cause the at least one processor to:

determine a selected page on a display device of the electronic device;

acquire sizes of characters on the selected page;

compute an adjustment ratio of the characters on the selected page according to a predetermined calculation method;

adjust a size of each of the characters on the selected page according to the acquired sizes of the characters on the selected page and the computed adjustment ratio of the characters on the selected page; and display each of the characters on the selected page on the displaying device with the adjusted size of each of the characters on the selected page;

wherein the adjustment ratio of the characters on the selected page is computed according to the predetermined calculation method by:

acquiring sizes of characters in a first preset region of the selected page;

acquiring sizes of characters in a second preset region of the selected page;

computing a weighted average size according to the sizes of the characters in the first preset region and the sizes of the characters in the second preset region; and computing the adjustment ratio of the characters on the selected page by dividing a preset size by the weighted average size;

wherein the weighted average size is computed according to a formula of $$Fwavg=\Sigma_{i=1}^{n}(f(i)/n\times w1)+\Sigma_{i=1}^{m}(g(i)/m\times w2))/(w1+w2),$$

f(i) representing a size of a ith character in the first preset region, w1 representing a weight corresponding to the characters in the first preset region, n representing a number of the characters in the first preset region, g(i) representing a size of a ith character in the second preset region, w2 representing a weight corresponding to the characters in the second preset region, m representing a number of the characters in the second preset region.

3. A non-transitory storage medium having stored thereon instructions that, when executed by a processor of an electronic device, causes the processor to perform a control method, wherein the method comprises:

determining a selected page on a display device of the electronic device;

acquiring sizes of characters on the selected page;

computing an adjustment ratio of the characters on the selected page according to a predetermined calculation method;

adjusting a size of each of the characters on the selected page according to the acquired sizes of the characters on the selected page and the computed adjustment ratio of the characters on the selected page; and displaying each of the characters on the selected page on the displaying device with the adjusted size of each of the characters on the selected page;

wherein the adjustment ratio of the characters on the selected page is computed according to the predetermined calculation method by:

acquiring sizes of characters in a first preset region of the selected page;

acquiring sizes of characters in a second preset region of the selected page;

computing a weighted average size according to the sizes of the characters in the first preset region and the sizes of the characters in the second preset region; and computing the adjustment ratio of the characters on the selected page by dividing a preset size by the weighted average size;

wherein the weighted average size is computed according to a formula of $$Fwavg=\Sigma_{1=1}^{n}(f(i)/n\times w1)+\Sigma_{i=1}^{m}(g(i)/m\times w2))/(w1+w2),$$

f(i) representing a size of a ith character in the first preset region, w1 representing a weight corresponding to the characters in the first preset region, n representing a number of the characters in the first preset region, g(i) representing a size of a ith character in the second preset region, w2 representing a weight corresponding to the characters in the second preset region, m representing a number of the characters in the second preset region.

* * * * *